(No Model.)
T. B. KNOWLES.
Lamp Chimney.
No. 236,440. Patented Jan. 11, 1881.
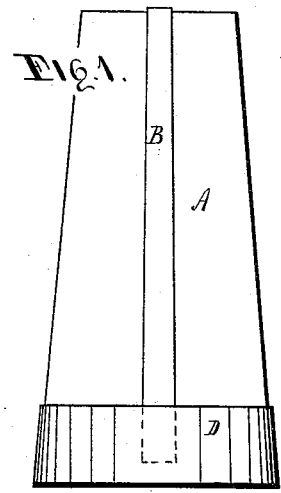
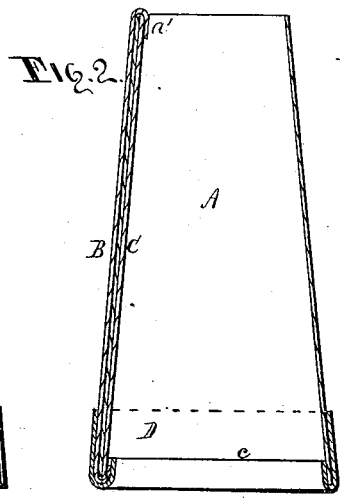
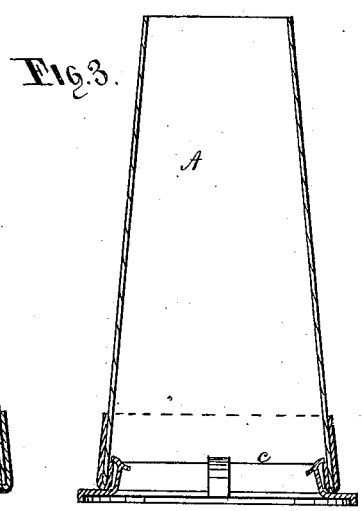
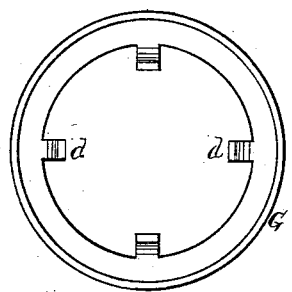
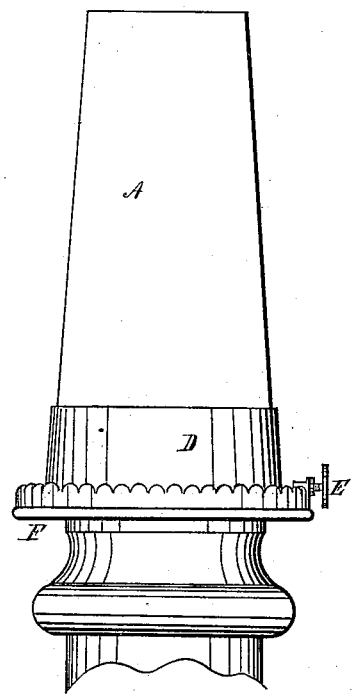
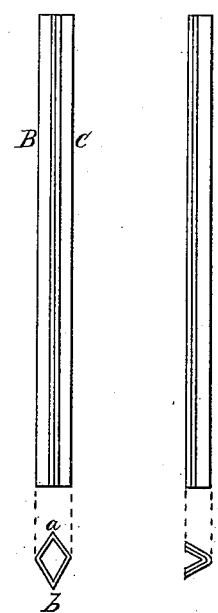
Witnesses.
J. H. Burridge
F. A. Lyman
Inventor.
Thos. B. Knowles
Wm. H. Burridge
Atty.
N. PETERS, PHOTO-LITHOGRAPHER, WASHINGTON, D. C.

(Model.)
P. LAFLIN.
Corset Steel Fastening.
No. 236,441.
Patented Jan. 11, 1881.
Fig:1.
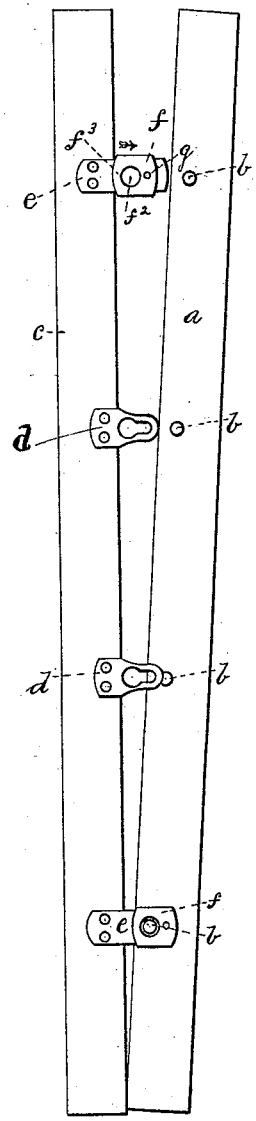
Fig:2.
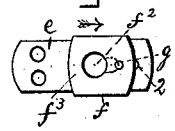
Fig:3.
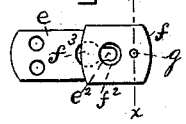
Fig:4.
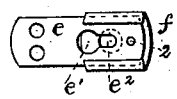
Fig:5.
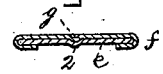
WITNESSES—
L. F. Connor.
V. D. Dearborn.
INVENTOR—
Perley Laflin
by Crosby & Gregory Attys